Patented Nov. 15, 1927.

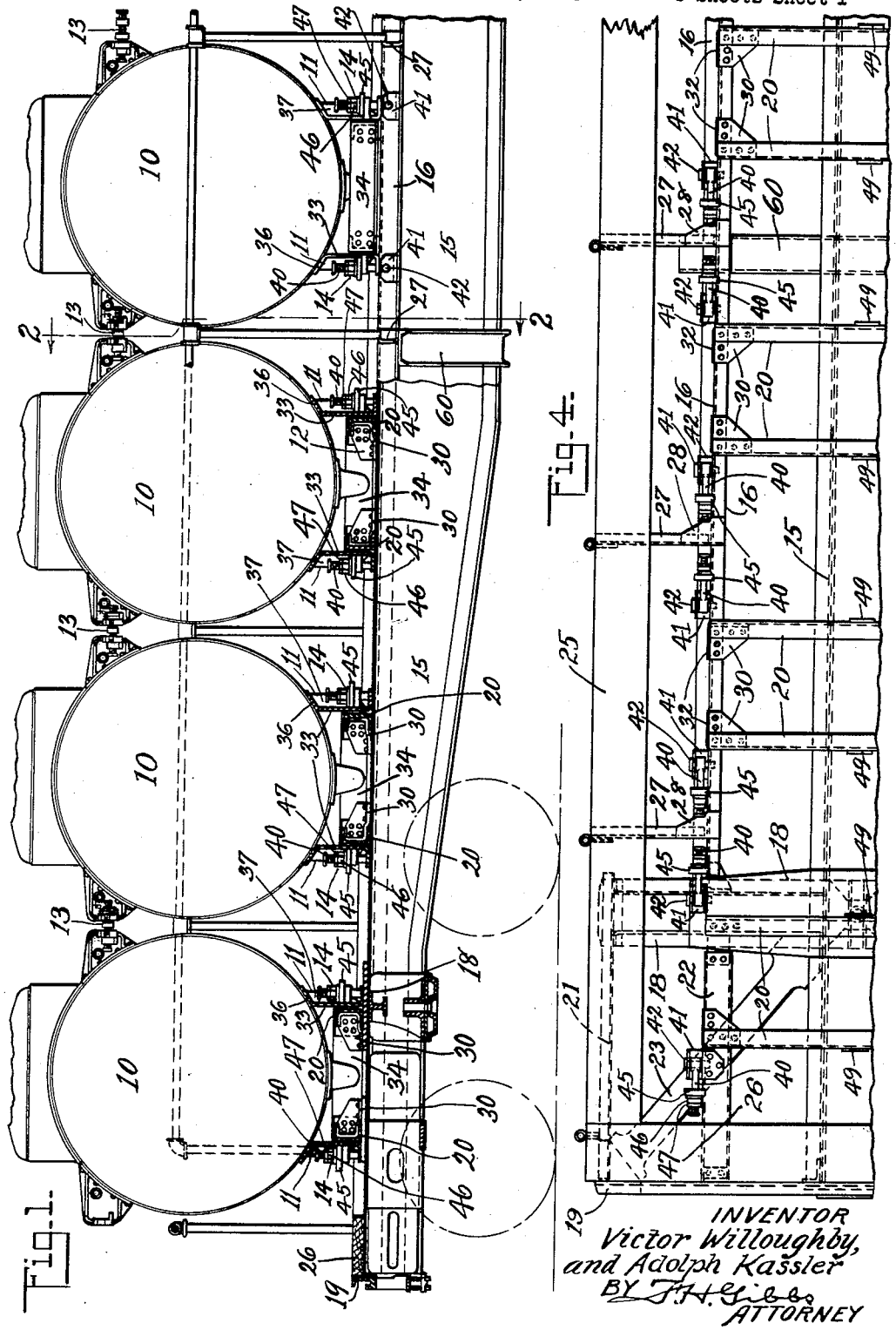

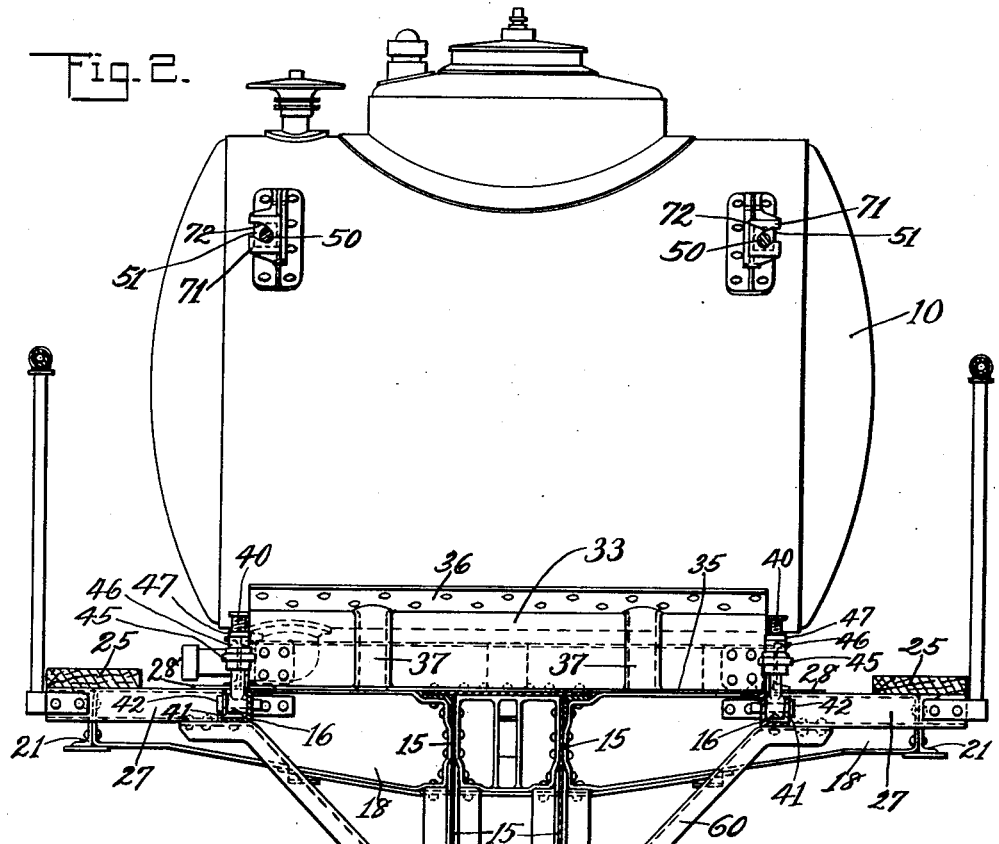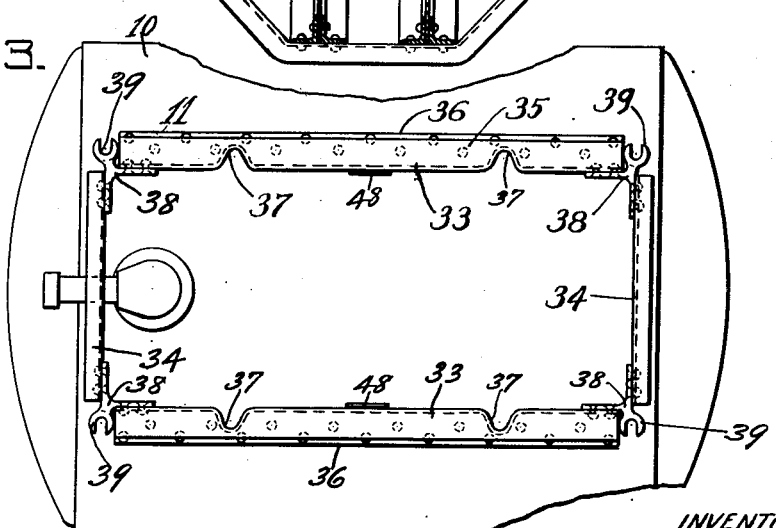

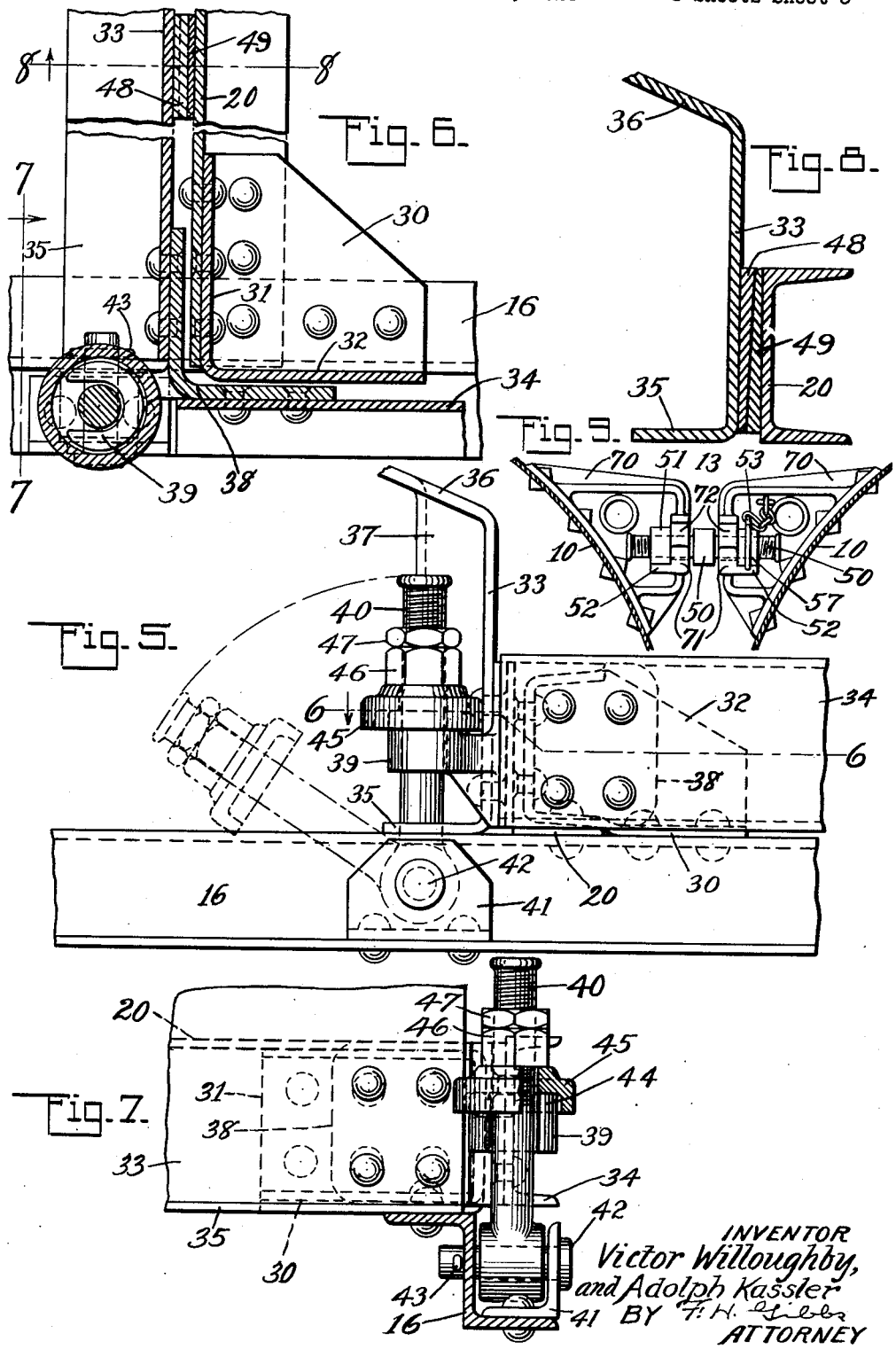

1,649,432

UNITED STATES PATENT OFFICE.

VICTOR WILLOUGHBY, OF RIDGEWOOD, NEW JERSEY, AND ADOLPH KASSLER, OF NEW YORK, N. Y., ASSIGNORS TO AMERICAN CAR AND FOUNDRY COMPANY, OF NEW YORK, N. Y., A CORPORATION OF NEW JERSEY.

TANK MOUNTING AND MULTIPLE-UNIT TANK CAR.

Application filed December 15, 1926. Serial No. 154,942.

In the drawings:

Fig. 1 is a fragmentary side view of a multiple unit tank car construction conveniently embodying the invention, various parts being broken away and in vertical section;

Fig. 2 is a side view of one of the tanks shown in Fig. 1, with associated parts of the car structure in transverse section as indicated by the line 2—2 in Fig. 1;

Fig. 3 is a fragmentary bottom plan view of one of the tanks;

Fig. 4 is a fragmentary plan view of the car frame structure with the tanks removed;

Fig. 5 is a fragmentary side view of a portion of the car frame and an associated part belonging to a tank,—similar to that afforded by Fig. 1, but on a larger scale;

Fig. 6 is a corresponding plan view, with some of the parts in horizontal section as indicated by the line 6—6 in Fig. 5;

Fig. 7 is a fragmentary view at right angles to Fig. 5, with a part of the car frame in cross section as indicated by the line 7—7 in Fig. 6, and a part of the tank securing means broken out;

Fig. 8 is a fragmentary sectional view, taken as indicated by the line 8—8 in Fig. 6; and Fig. 9 is a fragmentary side view illustrating the interconnection of adjacent tanks, which are shown in transverse vertical section.

This invention relates to the mounting and securing of tanks on cars, including multiple unit tank cars. It is an object of the invention to hold the tanks securely in place under any and all conditions of railway service,, yet to permit of their being removed from the car easily and expeditiously when desired. It is also an object of the invention to provide a simple and rugged construction for such purposes, including features and devices whose utility is not limited to multiple unit cars.

In Fig. 1, the invention is shown in connection with a series of horizontal cylindrical tanks 10 arranged transversely of a car. As shown in Figs. 1, 2, and 3, these tanks 10 are provided with permanently attached bases 11, which rest removably on the car platform or frame,—for as here shown, the car frame is practically without flooring in the ordinary sense. As also shown in Fig. 1, provision is made for maintaining the tanks 10 in definite positions on the car frame, by means 12 on the car frame co-operating with the bases 11 and around which the bases 11 are adapted to fit or engage. The tanks 10 are interconnected or secured together at their upper portions by means indicated at 13 in Fig. 1, and thereby braced together as against individual capsize. They are also positively but detachably secured to the car frame, by means indicated at 14 in Fig. 1.

In the main, the car frame or underframe is of ordinary construction, comprising center sills 15, and Z-bar side sills 16, interconnected by bolsters 18 and cross beams 60. In addition, the side sills 16 are interconnected and connected to the center sills by channel members 20, located or extending above the sills 15 and 16. Adjacent pairs of the channels 20 have their flanges turned inwardly. At the end of the car, the bolster 18 and end sill 19 have their outer ends interconnected by short side sills 21, and are also interconnected by short intermediate sills 22. The end sills 19 are braced with reference to the center sills 15 by diagonal members 23 connected at their inner ends to the center sills 15 and the bolsters 18, and connected at their outer ends to the outer ends of the end sills 19 and the side sills 21. Running boards 25 and 26 are provided at the sides and ends of the car, respectively, the side running boards 25 being supported by the side sills 21, the bolsters 18 and brackets 27 attached to the side sills 16 by means of gussets 28.

In the present instance, the means 12 on the car frame for maintaining the tanks 10 in definite position are formed by pairs of the transverse members 20, with the associated gussets 30 by which their ends are connected to the upper flanges of the side sills 16. As shown n Figs. 1, 4, 5 and 6, the gussets 30 have connected flanges 31, 32, the flanges 31 being secured by rivets to the webs of the corresponding channel members 20, while the flanges 32 extend upward from the tops of the sills 16 substantially in line with the sill webs, and afford bearing for the corresponding ends of the tank bases 11. The webs of the gussets 30 are secured by rivets to the top flanges of the sills 16 and the lower flanges of the members 20, being offset upward to accommodate the latter as shown in Fig. 5.

As shown in Figs. 1, 2, 3, and 5, each tank base 11 is of box-like form and construction, comprising spaced parallel channels 33 extending lengthwise of the tank, and channels 34 connecting the ends of the channels 33. The channels 33 have outward projecting bottom flanges 35, to afford ample bearing or footing on the sills 15 and 16, and outward projecting top flanges 36 shaped to conform to the curved bottom of the tank, to which these flanges 36 are secured in any suitable manner as by riveting or welding. The channels 33 are stiffened, and their flanges 35 and 36 braced by vertical embossments 37, best shown in Figs. 2, 3 and 5. The end channels 34 have their flanges turned outward, and are secured to the channels 33 by angular corner pieces 38 riveted to both of them. The corner pieces 38 carry forked securing lugs 39 which project and open towards the ends of the car and substantially in the planes of the channels 34. The lugs 39 form part of the securing devices 14, and co-operate with eye-bolts 40 pivotally mounted between the webs of the sills 16 and angle brackets 41 attached to the latter on pins 42, held in place by cotter pins 43. The lugs 39 have circular upwardly projecting bosses 44 which fit flanged washers 45 on the bolts 40 when the washers are clamped down on the lugs by nuts 46 and their lock nuts 47. When the nuts on these bolts are tightened, the bolts hold the tank base 11 down firmly and securely to the car frame, so as to resist capsizing or displacement of any sort.

Thus adjacent cross members 20 and their gussets 30 form rectangular projections or chocks around which are fitted the hollow tank base 11 and serve to resist movement of the tanks either longitudinally or transversely of the car. The tank bases 11 may be made firm on the chocks by means of oppositely disposed vertical wedges 48, 49 interposed between transverse members 20 and the bases and fixed to channels 33 and 20, respectively, as shown in Figs. 6 and 8.

As shown in Figs. 1, 2, 4 and 9, the lateral interconnections 13 between adjacent tanks 10 comprise brackets 70 whose curved feet fit and are riveted to the tank shells, and whose flanges 71 have upward sloping laterally open slots 72 to take securing bolts 50 having oppositely threaded ends equipped with nuts 51 for engaging behind the slotted bracket flanges. The flanges 71 have projecting lugs 52 for engaging the sides of the nuts so as to prevent the latter from turning when the bolts 50 are rotated, the mid portion of each bolt 51 being squared to afford a convenient wrench hold. A shackle chain 53 secured to one of the nuts 51 and to one of the brackets 70 prevents loss of the bolts 50 when removed, the end of the bolt 51 being upset to prevent removal of the nut.

What is claimed is:

1. A multiple unit tank car construction comprising a car frame, a plurality of tanks with attached supporting bases resting on said frame, and means for detachably securing said bases to the frame to connect the tanks to the frame.

2. A multiple unit tank car construction comprising a car frame, a series of transversely arranged tanks with attached bases resting thereon, means for detachably interconnecting the upper portions of adjacent tanks and bracing them together against individual capsize, and means for preventing shifting of the tanks on the car frame.

3. A multiple unit tank car construction comprising a car frame, a plurality of transversely arranged tanks, means detachably securing them on the frame, and means for detachably interconnecting the upper portions of adjacent tanks bracing them together against individual capsize.

4. A multiple unit tank car construction comprising a car frame, a plurality of tanks side by side thereon, brackets on said tanks at adjacent sides thereof, and means for securing said brackets to one another and thereby bracing the tanks together.

5. In a tank car construction of the character described, the combination with tanks ranged side by side, of brackets on said tanks at adjacent sides thereof with laterally open jaws, and bolts engaging in said jaws, to draw said tanks together when the bolts are tightened.

6. A multiple unit tank car construction comprising a car frame, a plurality of transverse tanks with attached bases resting on said frame, and adjustable securing means for said tanks pivoted to said frame and engageable with said bases.

7. A multiple unit tank car construction comprising a car frame with longitudinal sills, a plurality of tanks with attached bases resting on said sills, and adjustable securing means for said tanks pivoted beside the sills and swingable into and out of engagement with means on the tanks.

8. A multiple unit tank car construction comprising a plurality of tanks having supporting elements secured to the bases thereof, a car frame affording support for said supporting elements, and means on said car frame co-operating with said supporting elements to maintain the tanks in definite positions on the frame.

9. A multiple unit tank car construction comprising a plurality of tanks with bases thereon, a car frame affording support for said bases, means on said car frame co-operating with said bases to maintain the tanks in definite positions on the frame, and means for detachably interconnecting the upper portions of said tanks, so as to brace them together against individual capsize.

10. A multiple unit tank car construction comprising a plurality of tanks having supporting elements secured to the bases thereof, a car frame affording support for said supporting elements, and means on said car frame co-operating with said supporting elements to maintain the tanks in definite positions on the frame, and means for detachably fastening said tanks down to said frame.

11. A multiple unit tank car construction comprising a plurality of tanks with bases thereon, a car frame affording support for said bases, and means on said car frame co-operating with said bases to maintain the tanks in definite positions on the frame, means for detachably fastening said tanks down to said frame, and means for detachably interconnecting the upper portions of said tanks.

12. A multiple unit tank car construction comprising a car frame having projections thereon, and a plurality of tanks having bases resting on said frame around said projections, and thus maintained in definite positions by them.

13. A multiple unit tank car construction comprising a car frame with longitudinal sills and superjacent cross members interconnecting them, and a plurality of tanks with attached hollow bases resting on the sills around pairs of said cross members, and thus maintained in definite positions by them.

14. A multiple unit tank car construction comprising a car frame having a projection thereon, a tank with hollow base resting on said frame around said projection and provided with engagement means, and securing means for the tank attached to said frame and swingable into and out of engagement with said engagement means.

15. A multiple unit tank car construction comprising a car frame with longitudinal sills and superjacent cross members interconnecting them, a tank with attached hollow bases resting on the sills around pairs of said cross members and provided with projecting engagement means at its corners, and adjustable securing means for said tanks pivoted beside the sills and swingable into and out of engagement with said engagement means.

16. A multiple unit tank car construction comprising a car frame with longitudinal sills and superjacent cross members interconnecting them, a tank with attached hollow bases resting on the sills around pairs of said cross members and provided with projecting engagement means at its corners, adjustable securing means for said tanks pivoted beside the sills and swingable into and out of engagement with said engagement means, and means for detachably interconnecting the upper portions of said tanks.

17. A multi-unit tank car construction comprising a car frame, a plurality of attaching frames on said car frame, and a plurality of tanks having supporting frames formed thereon engaged with said attaching frames and positioning said tanks on the car frame.

18. A multi-unit tank car construction comprising a car frame, a plurality of attaching frames formed on said car frame, a plurality of tanks having supporting frames formed thereon engaged with said attaching frames and positioning said tanks on the car frame, and means on the car frame for engaging the supporting frames to retain said tanks in position.

19. A multi-unit tank car construction comprising a car frame having a center sill and cross-beams, means on said cross-beams forming attaching frames, and a plurality of tanks having supporting frames at the bottom thereof for engagement with said attaching frames, each of said tanks being positioned over a pair of cross-beams.

20. A multi-unit tank car construction comprising a car frame having a center sill and cross-beams, means on said cross-beams forming attaching frames, a plurality of tanks having supporting frames at the bottom thereof for engagement with said attaching frames, each of said tanks being positioned over a pair of cross-beams, and means on the car frame cooperating with said attaching frames and the supporting frames for retaining the tanks in position.

21. A multi-unit tank car construction comprising a car frame, a plurality of tanks arranged transversely of the car frame, attaching frames on said car frame, supporting frames on the tanks cooperating with the attaching frames for positioning said tanks, means on the car frame engaging said attaching frames and sppporting frames for retaining the tanks in position, and means on each tank near the uper portion thereof for connecting the tanks in a series.

In witness whereof we have hereunto set our hands.

VICTOR WILLOUGHBY.
ADOLPH KASSLER.